United States Patent [19]

Oderbolz et al.

[11] Patent Number: 4,568,272
[45] Date of Patent: Feb. 4, 1986

[54] METHOD OF OPERATING AN OPEN RING-TYPE FURNACE

[75] Inventors: Stefan Oderbolz, Veyras, Switzerland; Gerhard Bouwmeester, Spijkenisse, Netherlands

[73] Assignee: Swiss Aluminium Ltd., Chippis, Switzerland

[21] Appl. No.: 638,231

[22] Filed: Aug. 6, 1984

[30] Foreign Application Priority Data

Aug. 11, 1983 [CH] Switzerland .................. 4381/83

[51] Int. Cl.$^4$ .................. F27B 15/18; F27D 5/00; F27B 7/00
[52] U.S. Cl. .................. 432/17; 432/5; 432/192
[58] Field of Search .................. 432/3, 5, 17, 192

[56] References Cited

U.S. PATENT DOCUMENTS 4,371,333 2/1983 Moser et al. .................. 432/192

Primary Examiner—John J. Camby
Attorney, Agent, or Firm—Bachman & LaPointe

[57] ABSTRACT

The operation of an open ring-type baking furnace for the production of shaped carbonaceous bodies and having at least partly grouped fire shafts is such that during the fire reversal phase the negative pressure is regulated in each fire shaft in the transverse walls near the fire reversal units. This regulation takes place, depending on the position of the pre-heating zone, at the transverse wall on the suction unit side or on the baking side of the furnace. In particular in combination with process control means the process leads to a uniform product quality independent of the position of the said body in the furnace.

3 Claims, 6 Drawing Figures

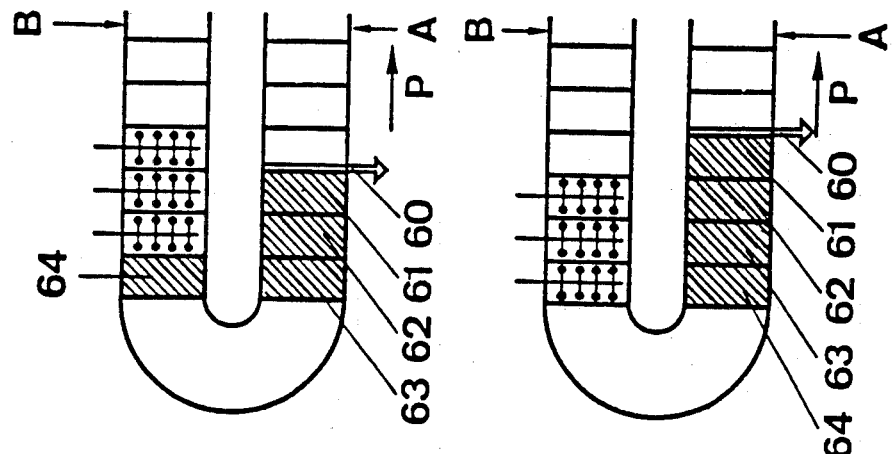
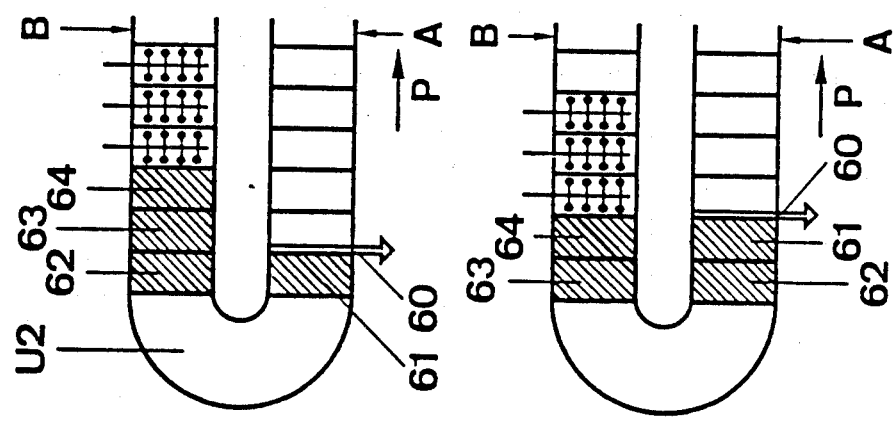

METHOD OF OPERATING AN OPEN RING-TYPE FURNACE

BACKGROUND OF THE INVENTION

The invention relates to a process for operating an open ring-type furnace, with firing shafts partly grouped together in the fire reversal unit, for manufacturing shaped carbonaceous bodies, mainly electrodes for the aluminum fused salt electrolytic process, by regulating at least the temperature and the negative pressure, and relates too to a device for carrying out the process.

The open ring-type furnace comprises a number of stationary baking chambers or pits aligned in rows next to each other and divided off by walls running transverse to the direction of progress of the fire, and by firing shafts arranged in cassettes and running in the direction of progress of the fire. A ring arrangement of the firing shafts is achieved by parallel arrangement of two rows or baking chambers, one on each side of the furnace, and by connecting up the two fire shaft systems at the ends of these rows via fire reversal units. The fire shaft systems are either connected up in such a manner that all firing shafts join up to a common duct, or are partly grouped together at the ends of the two rows in the fire reversal unit. In the case of eight firing shafts, for example, the three inner firing shafts and the two outer firing shafts are grouped together and connected to the corresponding groups on the other side of the furnace. It is of course also possible to connect up the fire shafts individually. This is, however, not advantageous as it would involve a very complicated construction requiring a great deal of space as well as yielding a low degree of firing efficiency.

The mode of operation of such baking furnaces has an extremely important influence on the quality of anode produced. Both the rate of heating to the baking temperature and the average baking temperature have a decisive influence on anode quality, in particular with regard to strength, electrical conductivity and reactivity. If temperature changes occur too quickly, the anodes may develop cracks or, if the average baking temperature is too low their reactivity may be poor.

In view of this there has been no lack of attempts to automate, at least in part, the operation of baking furnaces by means of process control. For this one needs an appropriate operating plan or model in order that the temperature change during the progress of a fire can be kept under control.

The operating model is itself influenced by the starting parameters, the planned temperature sequences and gradients, and by the correction plan on which the model is based. The correction plan indicates where a particular parameter is to be left unaffected or how it is to be changed in order to prevent over or undershooting the intended temperature or to make correction. Microprocessors are employed to regulate the appropriate parameter-mainly the temperature in the fire shaft and the negative pressure in the suction unit. These register the data and issue the commands for correction to the appropriate adjustment means-valves on the burners and slides on the suction unit. By starting parameters is to be understood the external conditions which are of fundamental importance e.g. the type of furnace construction and the condition of the furnace. Of great importance in this respect is the construction of the fire reversal unit.

When establishing the operating plan or model one usually obtains empirically determined relationships between the temperature change in the furnace and the properties of the anodes which experienced that change. Those conditions which lead to above average anode quality are then regarded as optimal. In subsequent runs with the furnace the aim is then to approach as closely as possible the advantageous sequence of baking temperatures using the adjustment means on the furnace.

When the fire is wholly on one side of the furnace it is possible, without any difficulty using the present day operating model, to regulate each firing shaft individually such that the planned sequence of baking temperatures is followed.

For reasons concerned with furnace design, however, the ring-type furnace can not be regulated by the same principle during the complete traverse of a fire round the furnace i.e. during the progress of a fire through all chambers. If a fire is at a stage where it is particularly on one side of the furnace and partly on the other side i.e. in the phase when the fire reverses its direction by moving round the end of one row of chambers to the next row on the other side, and the fire reversal unit is included in the fire then, due to the combination or termination of the fire shafts on the downstream side and the allocation of the fire shafts on the upstream side, it is no longer possible to achieve satisfactory individual adjustment of the fire shaft temperatures by regulating the negative pressure in the individual fire shafts on the side of the furnace where the leading end of the fire i.e. the first pre-heating chamber is situated. The result in such a case is a drop in anode quality.

The object of the present invention is therefore to operate a ring-type furnace of the kind described above-both without but in particular with process control-in such a manner that the quality of the anodes does not depend on the position of the anodes in the furnace. A particular object of the invention is to employ a means of process control which overcomes the diadvantages suffered during the operation of the furnace at the phase where fire reversal takes place.

SUMMARY OF THE INVENTION

These objects are achieved by way of the invention in that during the fire reversal phase the negative pressure is regulated at the transverse wall where the reversal is taking place.

According to a preferred version of the invention, when much the greater part of the pre-heating zone and the baking zone is on one side of the furnace, the regulation can take place at constant negative pressure on the suction unit on the baking side of the furnace.

When the pre-heating zone is equally distributed on both sides of the furnace, it has been found favourable for the regulation of the leading part of the pre-heating zone to be performed via the negative pressure setting on the suction unit, and the trailing part of the pre-heating zone via regulating facilities on the baking side of the furnace.

When much the greater part of the pre-heating zone is on the suction unit side of the furnace it has been found particularly favourable to regulate that part of the fire on the baking side of the furnace via regulating facilities on that side of the furnace and to regulate the part of the fire on the suction unit side of the furnace by the negative pressure setting on the suction unit.

The proposed process has the advantage that the individual control of the fire shafts-such as is possible via the standard programme when the fire is only on one side of the furnace-is extended at least in part to the fire reversal phase; this makes it much easier to approach the desired heating cycle and thus produce a better anode quality.

BRIEF DESCRIPTION OF THE DRAWINGS

Further advantages and details are revealed with the help of the drawings viz.,

FIG. 3: A schematic representation of a fire at various positions.

DETAILED DESCRIPTION

The operating model or plan for regulating a ring-type furnace is divided into a standard part and a part concerning the reversal of the fire i.e. turning the fire round the ends of the furnace. The standard part relates to the situation where the individual fire shafts can be regulated independent of each other; such a situation is not affected by the invention. Instead only the situations where the fire is in the reversal phase are affected, by which is to be understood all those transition phases where the pre-heating zone-including any sealing chambers-are moved from one side of the furnace to the other.

Figure 1:
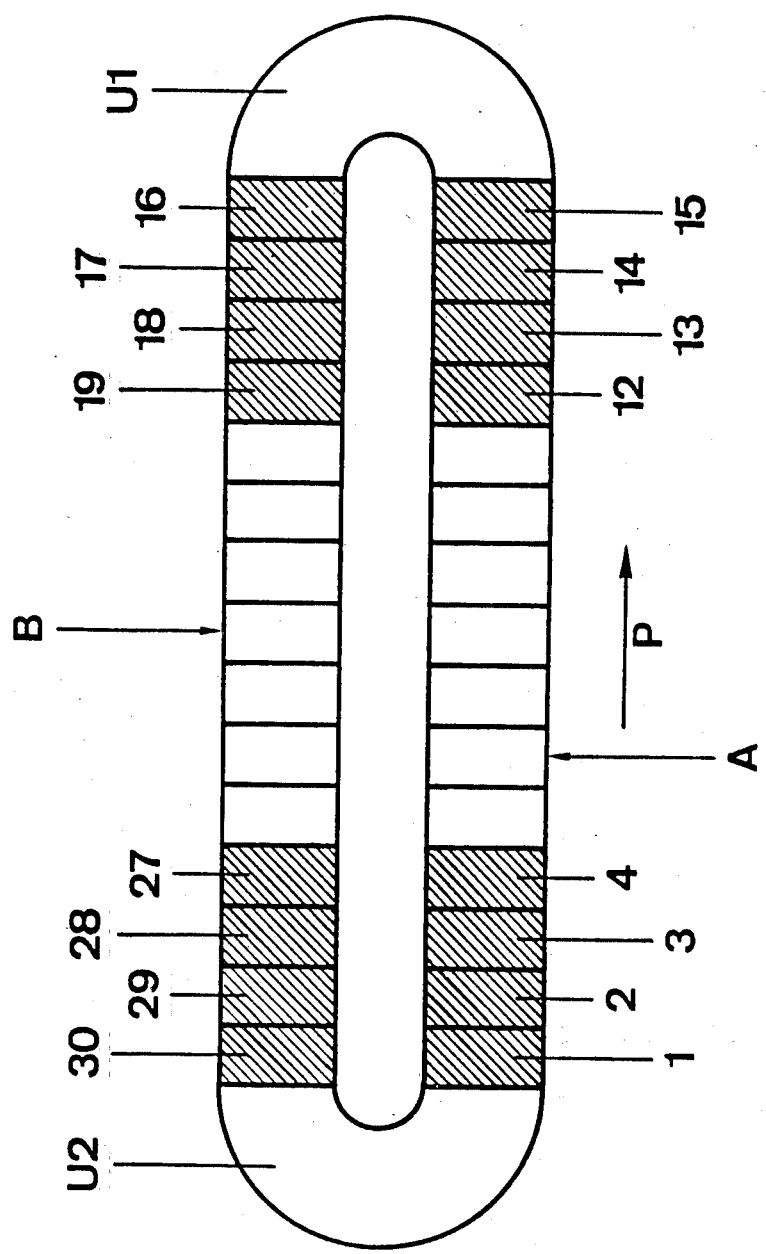
FIG. 1: A schematic representation of a ring-type baking furnace.

FIG. 1 shows by way of example a ring-type baking furnace having two sides or rows A and B each of which features 15 chambers 1–15 and 16–30. The fire shafts are not shown here for reasons of simplicity. Both rows of chambers are connected at the ends by reversal units U1 and U2 so that the whole forms a ring with units U1 and U2 each connecting a plurality of fire shafts from one side to the other. Affected by the process according to the invention are-in terms of the direction of fire movement shown by arrow P-the last chambers, depending on the arrangement of the fires viz. chambers 12, 13, 14, 15 on side A and the first chambers 16, 17, 18, 19 on side B at reversal unit U1 and, at reversal unit U2, the last chambers 27, 28, 29, 30 on side B and the first chambers 1, 2, 3 and 4 on side A. If the direction of fire movement is in the opposite direction then the equivalent applies for that direction. The exact number of chambers affected by reversal of the firing direction, i.e. from one side of the furnace to the other, depends on the actual number of chambers employed in the pre-heating zone, and is numerically the same for each side, A and B, of the furnace. The chambers affected in the case of a fire with a four-chamber preheating zone are shown shaded here.

Figure 2:
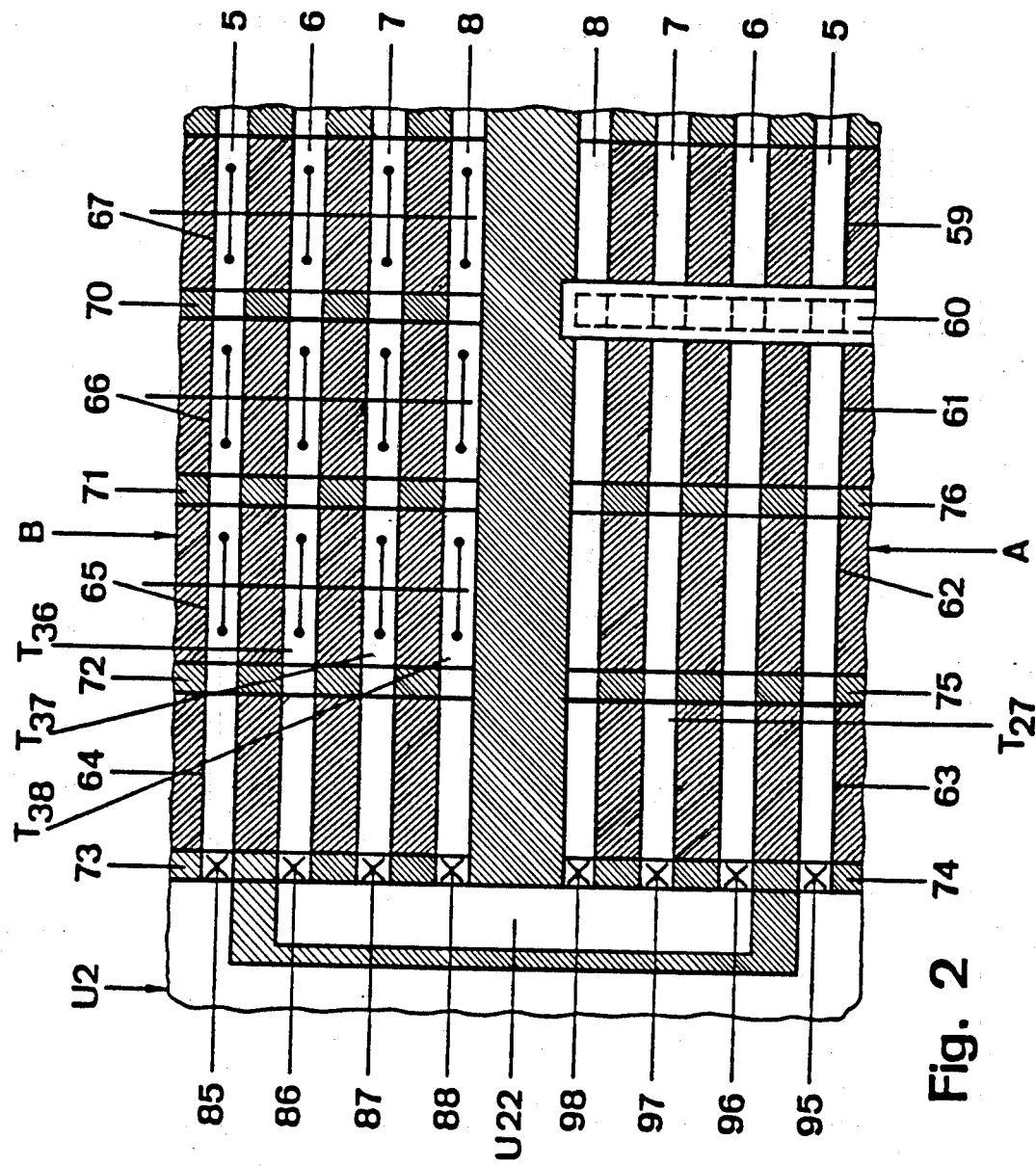
FIG. 2: A schamatic plan view of a ring-type baking furnace.

FIG. 2 shows by way of example the suction unit 60 and three pre-heating chambers 61, 62, 63 on side A and a fourth pre-heating chamber 64 on side B, which is followed directly by three baking chambers 65, 66, 67. The fire shafts 6, 7, 8 on side B are grouped in reversal unit U2 to a common channel U22 and continue on side A further as individual fire shafts. The transverse walls 70 to 76 divide the fire shafts in the region of the chambers. The walls 73 and 74 separate the reversal unit from the chamber or pit region of the furnace and contain the regulating facilities 85–88 and 95–98 according to the invention. The chamber 59 immediately ahead of the suction unit 60 usually serves as a sealing-off chamber.

FIG. 3 illustrates the progression of the fire from side B to side A and shows the fire at all stages of direction reversal with by way of example a fire with four chambers in the pre-heating zone (indicated shaded).

FIG. 3a shows the first chamber 61 of the pre-heating zone on side A while the other chambers 62, 63, 64 of the pre-heating zone, together with the rest of the fire-shown are only the three baking chambers-are still on side B of the furnace. The changes in the amounts of gas are carried out in accordance with the standard part of the control mode. Fixed setting facilities, either with a setting device for all fire shafts or individual devices for each fire shaft, are mounted on the suction unit 60. The setting facilities are usefully fixed in advance by the plant operation system and adjusted to suit the negative pressure conditions at certain intervals of time in response to new measurements. The changes in negative pressure, which are likewise given by the process control system, are brought about via the regulating facilities 85, 86, 87, 88 (FIG. 2) e.g. slides, on side B. If the effect of these alterations is inadequate, then the setting of the suction unit must be changed.

FIG. 3b shows two chambers 61, 62 of the pre-heating zone on side A and two chambers 63, 64 of the pre-heating zone on side B along with the baking chambers. In this fire reversal situation the changes in the amount of gas are made in accordance with the standard part of the model. The changes in negative pressure are made, for the chambers on side A, via the settings on the suction unit, and for the chambers on side B via the regulating facilities 85, 86, 87, 88 in the wall 73 on side B next to the fire reversal unit.

If, as shown in FIGS. 3c and FIG. 2, the first three chambers 61, 62, 63 of the pre-heating zone are already on side A, and only the last chamber 64 of the pre-heating zone-together with the baking chambers-is on side B, then when changing the amounts of gas in a fire shaft in the chambers 63, 64 immediately adjacent to the fire reversal unit, the amounts of gas are uniformly distributed over the connected fire shafts in the pre-heating zone and conducted to the appropriate fire shaft via regulation of the negative pressure at the suction unit 60. If for example the temperature $T_{27}$ (FIG. 2) in fire shaft 7 on side A is to be corrected and the temperatures $T_{36}$ to $T_{38}$ lie within the tolerated limits of the intended temperatures, then the amount of gas in the pre-heating zone in the fire shafts 6, 7 and 8 (6, 7 and 8 are reversed together) must be reduced or increased and the setting on the suction unit for fire shaft 7 accordingly opened or closed. The individual steps at the time of reversal are combined for the actual control measures. The necessary regulation of the changes in negative pressure is distributed as follows: the chambers 61, 62 and 63 of the pre-heating zone are controlled with the aid of the settings on the suction unit and chamber 64 along with at least part of the baking zone influenced with the aid of the regulating facilities 85, 86, 87, 88 in the wall 73 (FIG. 2).

FIG. 3d shows the situation at the reversal of the fire direction where all the chambers 61, 62, 63 and 64 of the pre-heating zone are already on side A of the furnace. The changes in the amounts of gas are performed in principle in a manner analogous to that described above in connection with FIG. 3c. In this new situation the regulating facilities 85, 86, 87, 88 on the side of the furnace where the baking zone is, i.e. on side B, are removed and the regulation of the fire on side A effected by the regulating facilities 95, 96, 97, 98 in wall 74, and all chambers in the pre-heating zones regulated by the suction unit setting. If any changes in negative pressure are required in the part of the baking zone near the pre-heating zone, then an additional, specific change in the amount of gas must be effected.

The regulation of the negative pressure in the fire reversal unit by regulating facilities 85–88, 95–98 in wall 73 or 74 is effected by constricting the cross section of the passage-way in the transverse wall leading from the fire shaft to the reversal unit. The change in cross section is usefully effected by slides which can be positioned preferably by motor drives responding to correction commands from the correction programme of the operation model. The slide in its simplest form comprises a metal sheet with a rubber lip round its edges.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. In an open ring-type furnace having at least two groups of fire shafts connected by at least one fire reversal unit for dividing said furnace into two sides, a process for regulating the temperature and negative pressure in the furnace during the reversal of the firing direction comprising providing regulating means between each of said two groups of fire shafts and said fire reversal unit for controlling the flow of air between said two groups of fire shafts through said reversal unit and adjusting said regulating means so as to control the flow of air.

2. A process according to claim 1 including the steps of providing a suction unit in one of said two sides of said furnace and regulating the temperature and negative pressure in said furnace by setting said suction unit at a constant negative pressure setting.

3. A process according to claim 2 including making a negative pressure setting for each of the fire shafts.

* * * * *